(12) United States Patent
Bodgan et al.

(10) Patent No.: US 7,631,272 B2
(45) Date of Patent: Dec. 8, 2009

(54) FOCUS SCOPE

(75) Inventors: Jeffrey L. Bodgan, Bellevue, WA (US); Atanas G. Koralski, Redmond, WA (US); Seema L. Ramchandani, Seattle, WA (US); Jevan D. Saks, Redmond, WA (US); Sundaram Ramani, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 247 days.

(21) Appl. No.: 11/272,665

(22) Filed: Nov. 14, 2005

(65) Prior Publication Data

US 2007/0113205 A1  May 17, 2007

(51) Int. Cl.
*G06F 3/048* (2006.01)
(52) U.S. Cl. .................. 715/802; 715/767; 715/825; 715/853; 715/854
(58) Field of Classification Search .................. 715/767, 715/825, 853, 854, 762, 802
See application file for complete search history.

(56) References Cited

U.S. PATENT DOCUMENTS

| | | | | |
|---|---|---|---|---|
| 5,864,819 | A * | 1/1999 | De Armas et al. | 704/275 |
| 6,215,490 | B1 | 4/2001 | Kaply | |
| 6,442,620 | B1 | 8/2002 | Thatte | |
| 6,496,208 | B1 | 12/2002 | Bernhardt | |
| 6,606,106 | B1 * | 8/2003 | Mendenhall et al. | 715/854 |
| 6,762,776 | B2 * | 7/2004 | Huapaya | 715/802 |
| 6,904,565 | B1 | 6/2005 | Lentz | |
| 6,928,619 | B2 | 8/2005 | Clow | |
| 2003/0020754 | A1 | 1/2003 | Berman | |
| 2005/0071785 | A1 | 3/2005 | Chadzelek | |
| 2005/0091604 | A1 | 4/2005 | Davis | |
| 2005/0223334 | A1 | 10/2005 | Guido | |

FOREIGN PATENT DOCUMENTS

DE    0820000    1/1998
GB    2362485    11/2001

OTHER PUBLICATIONS

Modality Abstraction: Capturing Logical Interaction Design as Abstraction from User Interfaces http://webdoc.gwdg.de/ebook/ah/2001/workshop/gellersen.pdf.
Embedded Wizard http://www.tara-systems.de/emwi/.
Xui: Finally, a Java GUI Framework You Can Love http://www.devx.com/Java/Article/27383/1954?pf=true.
A Primer on Sun Java Studio Creator http://developers.sun.com/prodtech/javatools/jscreator/reference/techart/primer.html.

* cited by examiner

*Primary Examiner*—Kieu Vu
*Assistant Examiner*—Haoshian Shih
(74) *Attorney, Agent, or Firm*—Workman Nydegger

(57) ABSTRACT

Aspects of the subject matter described herein relate to directing focus to elements of a graphical user interface in response to focus events. In aspects, a program may include multiple focus scopes each of which may include elements capable of receiving keyboard input. When an element receives keyboard focus, information regarding the element is updated to indicate that the element has or had keyboard focus. Thereafter, focus scope may be changed to a focus scope other than the one including the element. When changing the focus scope back to the focus scope that includes the element, the information may be used to give the element keyboard focus.

20 Claims, 13 Drawing Sheets

FOCUS SCOPE

BACKGROUND

When a user opens an application, the user may have access to controls that allow the user to perform various functions in the application. For example, the user may be able to cut or copy text or other objects from the application and paste the text or other objects into another application.

These controls may be invoked in various ways. For example, a user may select a menu toolbar via a mouse and navigate through menus to find a cut or copy command. As another example, a user may enter an "alt" key to access a menu.

With the variety of input devices and applications that may need to use controls, implementing and using a user interface architecture is becoming more complex. This complexity is increasing the work needed to be performed by application developers and others in developing programs that use controls.

SUMMARY

Briefly, aspects of the subject matter described herein relate to directing focus to elements of a graphical user interface in response to focus events. In aspects, a program may include multiple focus scopes each of which may include elements capable of receiving keyboard input. When an element receives keyboard focus, information regarding the element is updated to indicate that the element has or had keyboard focus. Thereafter, focus scope may be changed to a focus scope other than the one including the element. When changing the focus scope back to the focus scope that includes the element, the information may be used to give the element keyboard focus.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "one or more aspects". Identifying aspects of the subject matter described in the Detailed Description is not intended to identify key or essential features of the claimed subject matter.

The aspects described above and other aspects will become apparent from the following Detailed Description when taken in conjunction with the drawings, in which:

DETAILED DESCRIPTION

Exemplary Operating Environment

Figure 1:
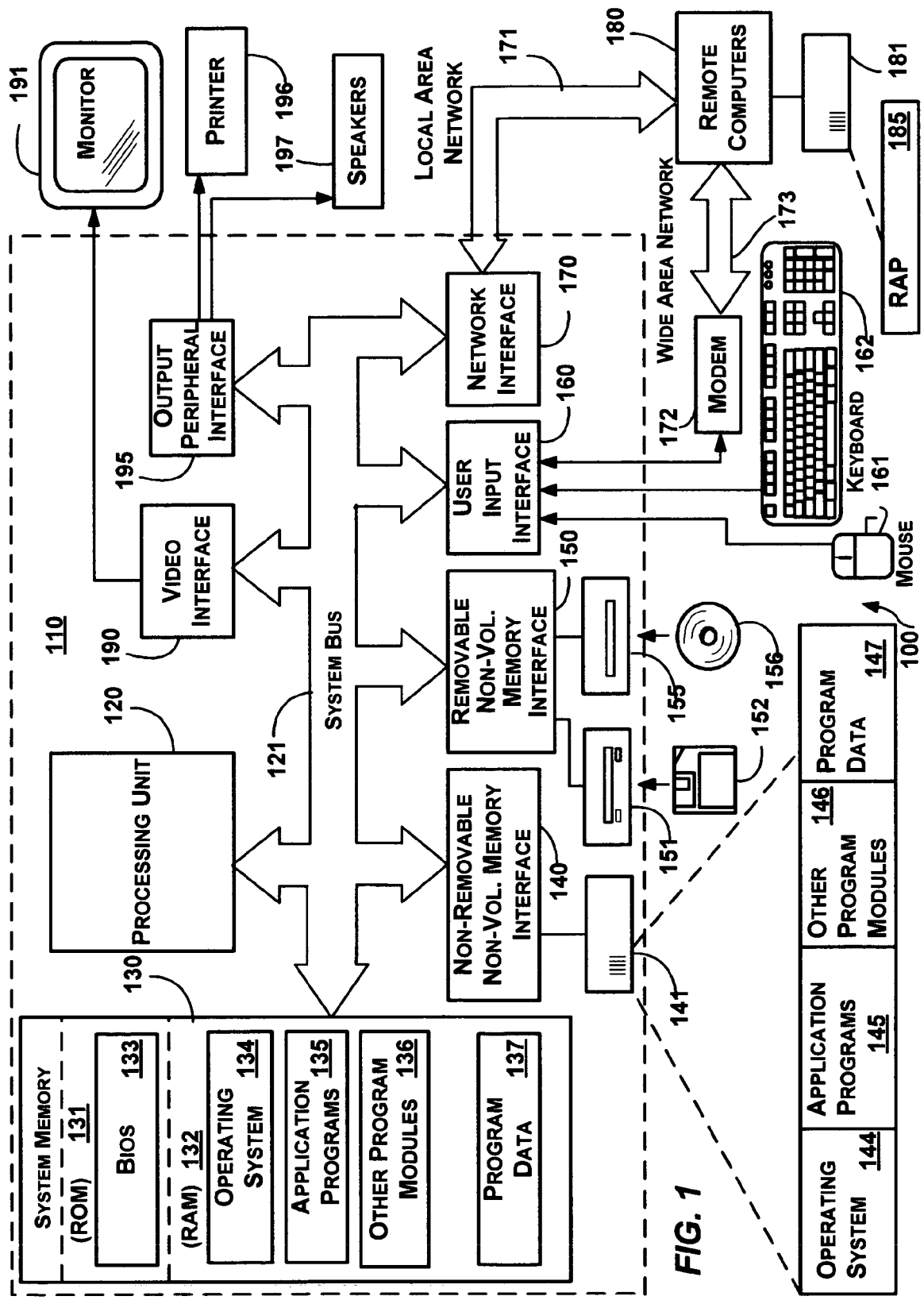
FIG. 1 is a block diagram representing a computer system into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Interfaces

A programming interface (or more simply, interface) may be viewed as any mechanism, process, or protocol for enabling one or more segment(s) of code to communicate with or access the functionality provided by one or more other segment(s) of code. Alternatively, a programming interface may be viewed as one or more mechanism(s), method(s), function call(s), module(s), object(s), and the like of a component of a system capable of communicative coupling to one or more mechanism(s), method(s), function call(s), module(s), and the like of other component(s). The term "segment of code" is intended to include one or more instructions or lines of code, and includes, for example, code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 2A:
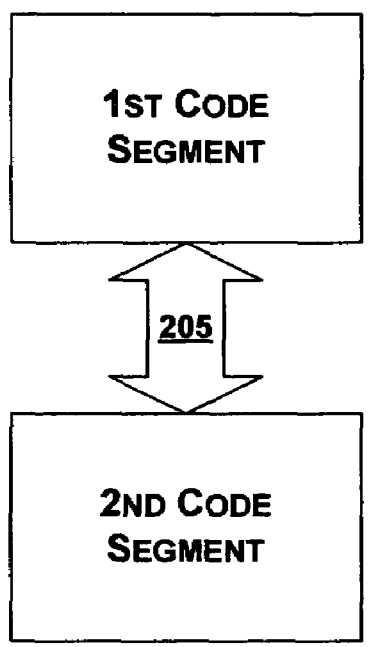
FIGS. 2A-6B are block diagrams generally representing exemplary application programming interfaces that may operate in accordance with aspects of the subject matter described herein.
Figure 2B:
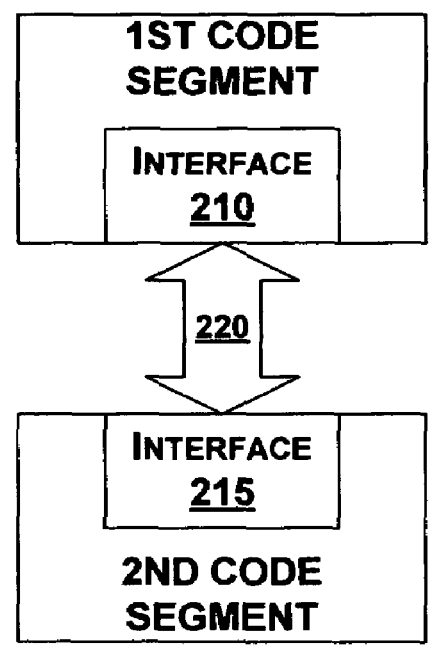

Notionally, a programming interface may be viewed generically, as shown in FIG. 2A or FIG. 2B. FIG. 2A illustrates an interface 205 as a conduit through which first and second code segments communicate. FIG. 2B illustrates an interface as comprising interface objects 210 and 215 (which may or may not be part of the first and second code segments), which enable first and second code segments of a system to communicate via medium 220. In the view of FIG. 2B, one may consider interface objects 210 and 215 as separate interfaces of the same system and one may also consider that objects 210 and 215 plus medium 220 comprise the interface. Although FIGS. 2A and 2B show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing, and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g., information placed in a buffer, file, etc. separate from information flow between the code segments) or non-existent, as when one code segment simply accesses functionality performed by a second code segment. Any or all of these aspects may be important in a given situation, for example, depending on whether the code segments are part of a system in a loosely coupled or tightly coupled configuration, and so this list should be considered illustrative and non-limiting.

This notion of a programming interface is known to those skilled in the art and is clear from the foregoing detailed description. There are, however, other ways to implement a programming interface, and, unless expressly excluded, these too are intended to be encompassed by the claims set forth at the end of this specification. Such other ways may appear to be more sophisticated or complex than the simplistic view of FIGS. 2A and 2B, but they nonetheless perform a similar function to accomplish the same overall result. Below are some illustrative alternative implementations of a programming interface.

A. Factoring

Figure 3A:
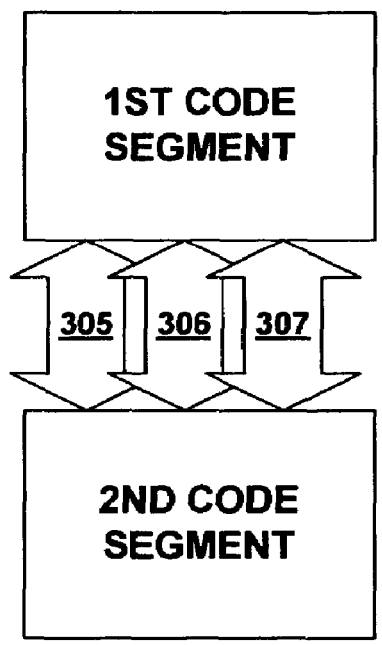

A communication from one code segment to another may be accomplished indirectly by breaking the communication into multiple discrete communications. This is depicted schematically in FIGS. 3A and 3B. As shown, some interfaces can be described in terms of divisible sets of functionality. Thus, the interface functionality of FIGS. 2A and 2B may be factored to achieve the same result, just as one may mathematically provide 24 as 2 times 2 times 3 times 2. Accordingly, as illustrated in FIG. 3A, the function provided by interface 205 may be subdivided to convert the communications of the interface into multiple interfaces 305, 306, 307, and so on while achieving the same result.

Figure 3B:
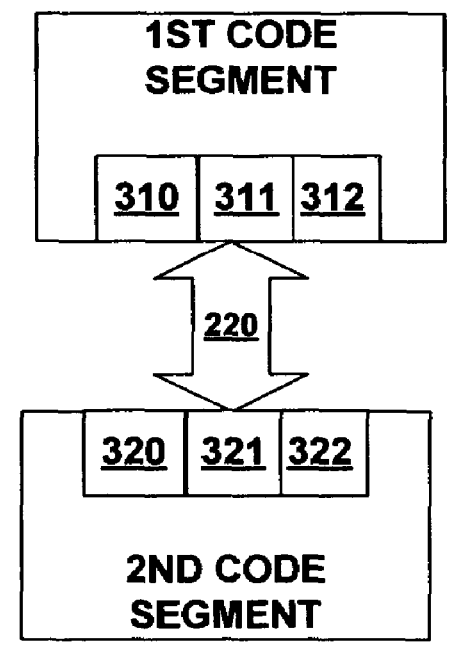

As illustrated in FIG. 3B, the function provided by interface 210 may be subdivided into multiple interfaces 310, 311, 312, and so forth while achieving the same result. Similarly, interface 215 of the second code segment which receives information from the first code segment may be factored into multiple interfaces 320, 321, 322, and so forth. When factoring, the number of interfaces included with the $1^{st}$ code segment need not match the number of interfaces included with the $2^{nd}$ code segment. In either of the cases of FIGS. 3A and 3B, the functional spirit of interfaces 205 and 210 remain the same as with FIGS. 2A and 2B, respectively.

The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 4A:
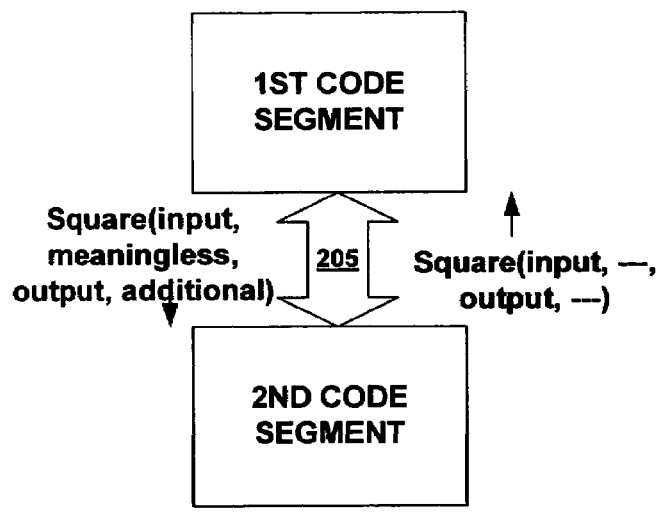
Figure 4B:
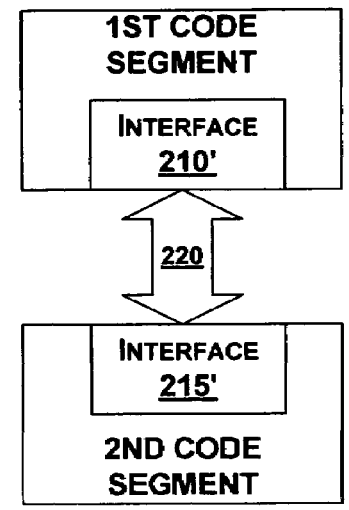

In some cases, it may be possible to ignore, add, or redefine certain aspects (e.g., parameters) of a programming interface while still accomplishing the intended result. This is illustrated in FIGS. 4A and 4B. For example, assume interface 205 of FIG. 2A includes a function call Square (input, precision, output), that includes three parameters, input, precision and output, and which is issued from the $1^{st}$ Code Segment to the $2^{nd}$ Code Segment. If the middle parameter precision is of no concern in a given scenario, as shown in FIG. 4A, it could just as well be ignored or even replaced with a meaningless (in this situation) parameter. An additional parameter of no concern may also be added. In either event, the functionality of square can be achieved, so long as output is returned after input is squared by the second code segment.

Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 4B, interface 210 is replaced by interface 210', redefined to ignore or add parameters to the interface. Interface 215 may similarly be redefined as interface 215', redefined to ignore unnecessary parameters, or parameters that may be processed elsewhere. As can be seen, in some cases a programming interface may include aspects, such as parameters, that are not needed for some purpose, and so they may be ignored or redefined, or processed elsewhere for other purposes.

C. Inline Coding

Figure 5A:
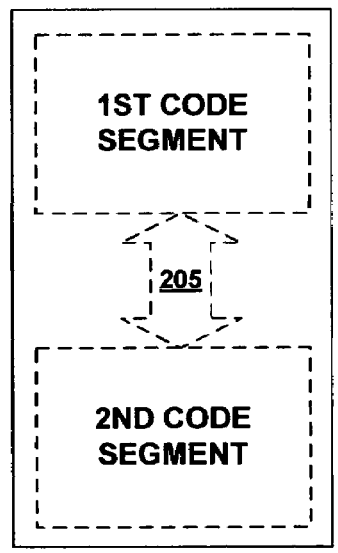
Figure 5B:
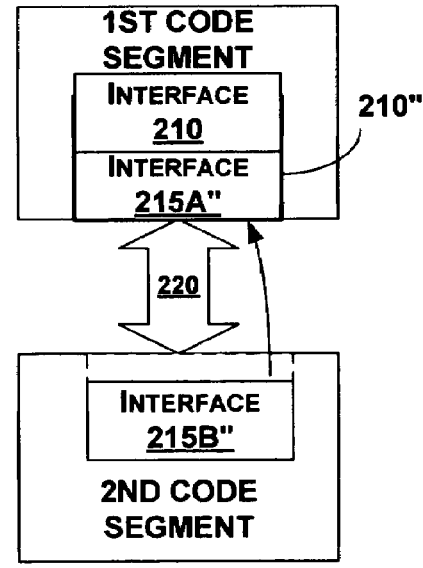

It may also be feasible to merge some or all of the functionality of two separate code modules such that the "interface" between them changes form. For example, the functionality of FIGS. 2A and 2B may be converted to the functionality of FIGS. 5A and 5B, respectively. In FIG. 5A, the previous $1^{st}$ and $2^{nd}$ Code Segments of FIG. 2A are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface 205 may still be in effect. Similarly, shown in FIG. 5B, part (or all) of interface 215 from FIG. 2B may be written inline into interface 210 to form interface 210". As illustrated, interface 215 is divided into 215A" and 215B", and interface portion 215A" has been coded in-line with interface 210 to form interface 210".

For a concrete example, consider that the interface 210 from FIG. 2B may perform a function call square (input, output), which is received by interface 215, which after processing the value passed with input (to square it) by the second code segment, passes back the squared result with output. In such a case, the processing performed by the second code segment (squaring input) can be performed by the first code segment without a call to the interface.

D. Divorce

Figure 6A:
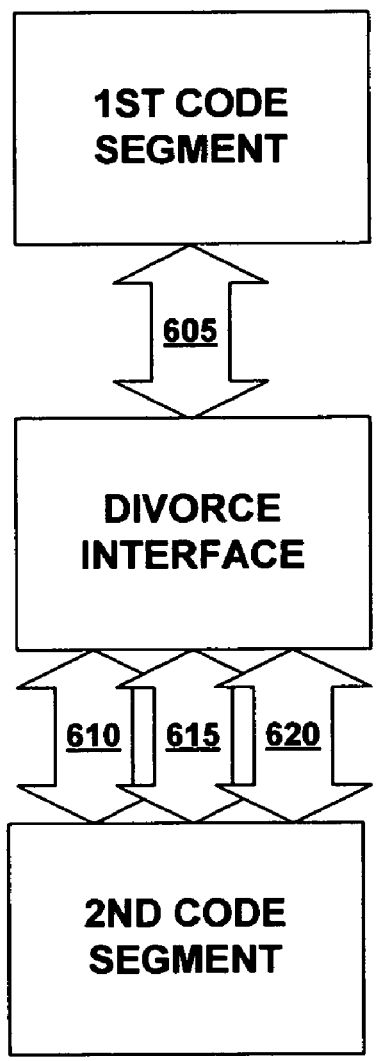

A communication from one code segment to another may be accomplished indirectly by breaking the communication into multiple discrete communications. This is depicted schematically in FIGS. 6A and 6B. As shown in FIG. 6A, one or more piece(s) of middleware (Divorce Interface(s), since they divorce functionality and/or interface functions from the original interface) are provided to convert the communications on the first interface 605, to conform them to a different interface, in this case interfaces 610, 615, and 620. This might be done, for example, where there is an installed base of applications designed to communicate with, say, an operating system in accordance with an the first interface 605's protocol, but then the operating system is changed to use a different interface, in this case interfaces 610, 615, and 620. It can be seen that the original interface used by the $2^{nd}$ Code Segment is changed such that it is no longer compatible with the interface used by the $1^{st}$ Code Segment, and so an intermediary is used to make the old and new interfaces compatible.

Figure 6B:
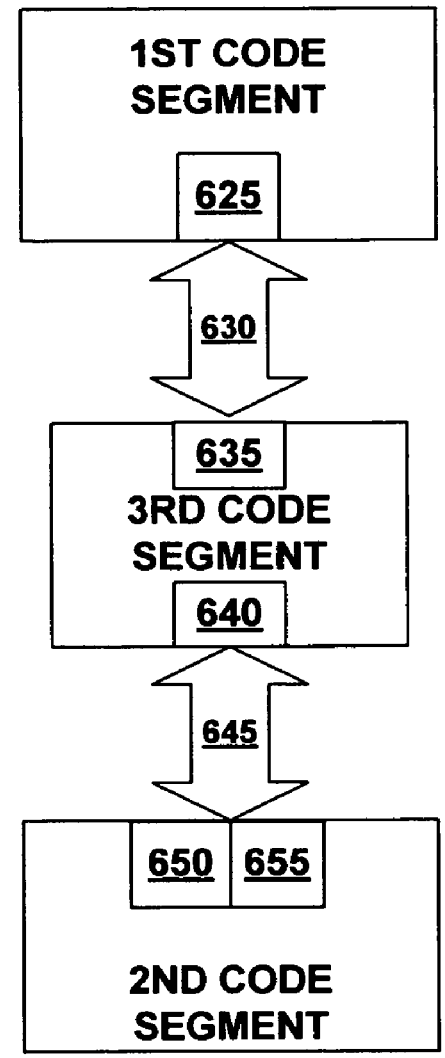

Similarly, as shown in FIG. 6B, a third code segment can be introduced with divorce interface 635 to receive the communications from interface 630 and with divorce interface 640 to transmit the interface functionality to, for example, interfaces 650 and 655, redesigned to work with 640, but to provide the same functional result. Similarly, 635 and 640 may work together to translate the functionality of interfaces 210 and 215 of FIG. 2B to a new operating system, while providing the same or similar functional result.

E. Rewriting

Yet another possible variant is to dynamically rewrite the code to replace the interface functionality with something else but which achieves the same overall result. For example, there may be a system in which a code segment presented in an intermediate language (e.g. Microsoft IL, Java® Byte-Code, etc.) is provided to a Just-in-Time (JIT) compiler or interpreter in an execution environment (such as that provided by the Net framework, the Java® runtime environment, or other similar runtime type environments). The JIT compiler may be written so as to dynamically convert the communications from the $1^{st}$ Code Segment to the $2^{nd}$ Code Segment, i.e., to conform them to a different interface as may be required by the $2^{nd}$ Code Segment (either the original or a different $2^{nd}$ Code Segment). This is depicted in FIGS. 7 and 8.

Figure 7:
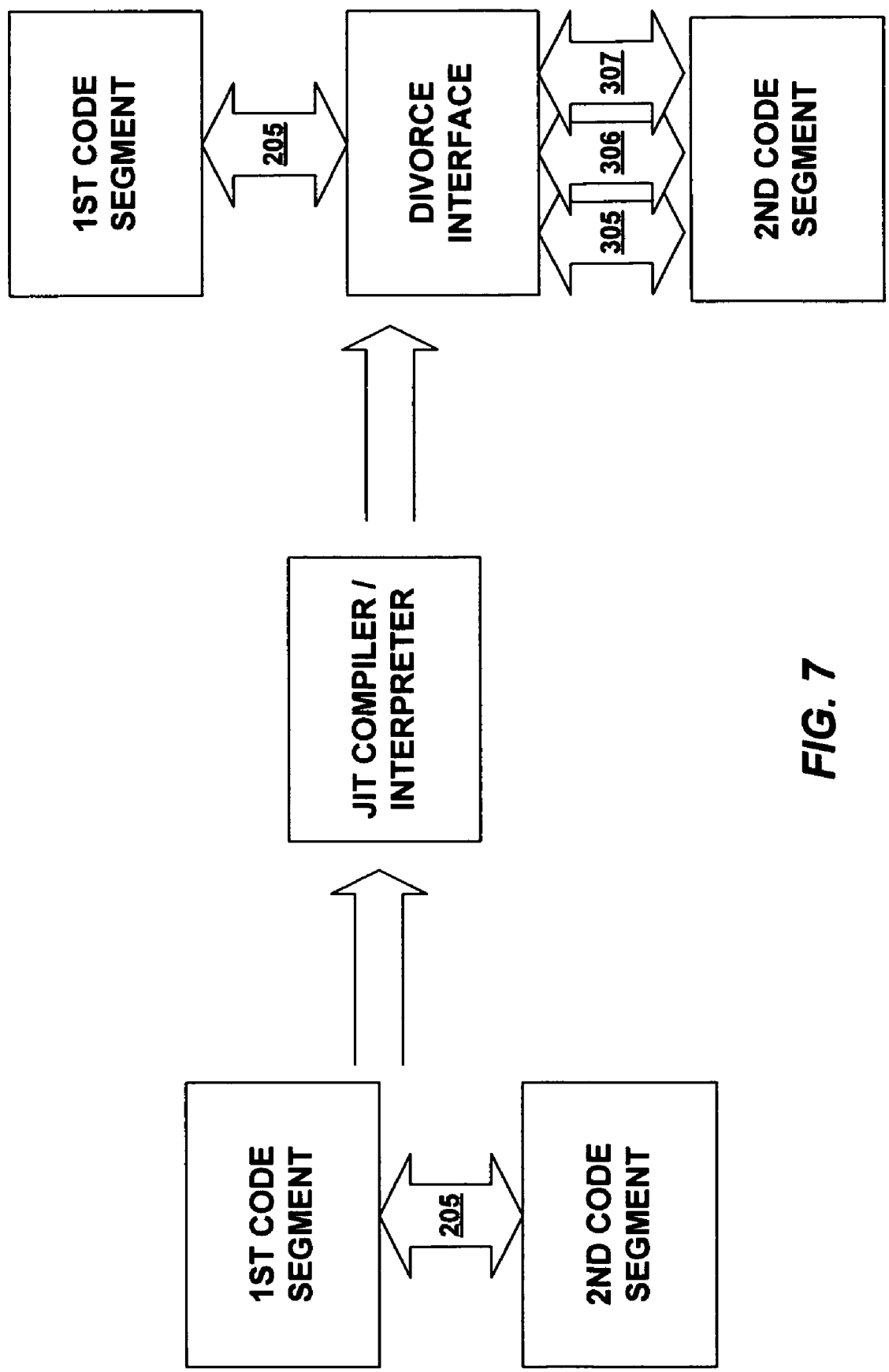
FIGS. 7 and 8 are block diagrams that generally represent how a compiler or interpreter may transform one or more interfaces to one or more other interfaces in accordance with aspects of the subject matter described herein.
Figure 8:
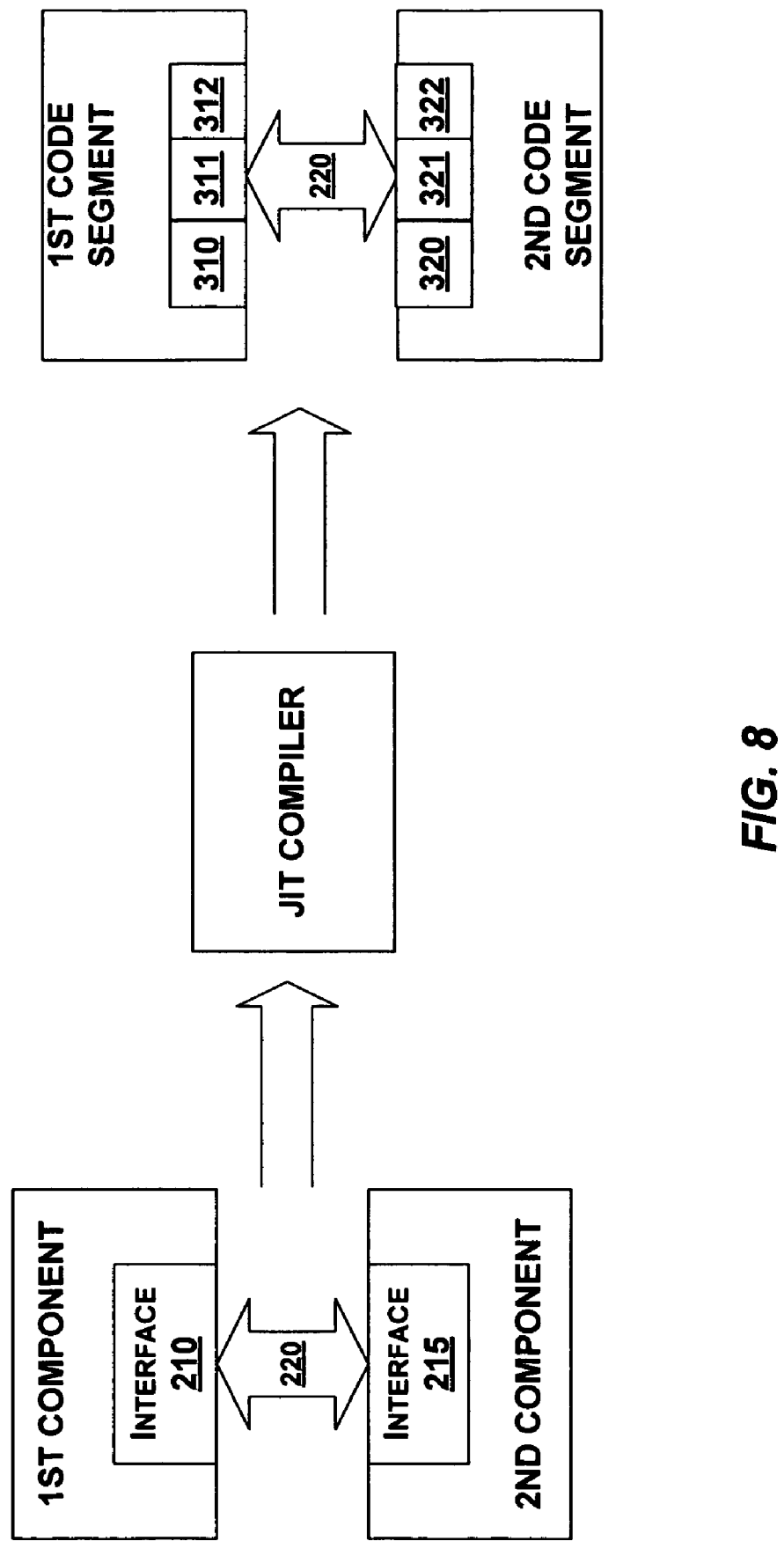

As can be seen in FIG. 7, this approach is similar to the Divorce scenario described above. It might be done, for example, where an installed base of applications are designed to communicate with an operating system in accordance with a first interface protocol, but then the operating system is changed to use a different interface. The JIT Compiler may be used to conform the communications on the fly from the installed-base applications to the new interface of the operating system. As depicted in FIG. 8, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched, and combined to produce the same or equivalent scenarios to the generic scenarios presented in FIGS. 2A and 2B. It is also noted that, as with most programming constructs, there are other similar ways of achieving the same or similar functionality of an interface which may not be described herein, but nonetheless are represented by the spirit and scope of the subject matter described herein, i.e., it is noted that it is at least partly the functionality represented by, and the advantageous results enabled by, an interface that underlie the value of an interface.

Logical Focus

Figure 9:
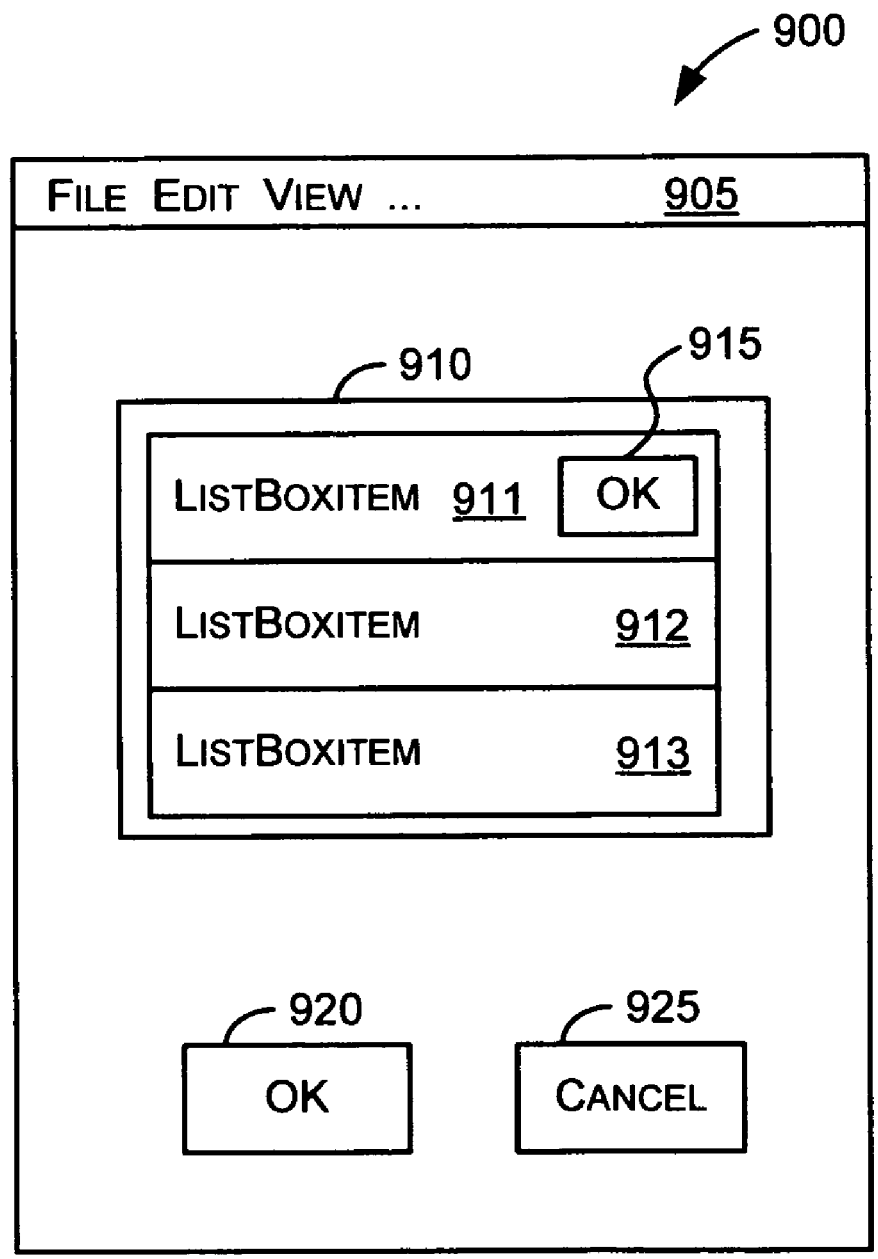
FIG. 9 is a diagram representing components of an exemplary window in accordance with aspects of the subject matter described herein.

FIG. 9 is a diagram representing components of an exemplary window in accordance with aspects of the subject matter described herein. The components (sometimes called controls or elements) may include a menu 905, a list box control 1135, and OK and Cancel buttons 920 and 925, for example. The list box control 910 may include three list box items 911-913. One of the list box items (e.g., list box item 911) may include an OK button 915.

In general, each component may be composed of zero or more other components. For example, any control may include zero or more other controls which may include zero or more other controls and so forth. Furthermore, it will be recognized, that the window described in conjunction with FIG. 9 may have more, fewer, or other components which may be configured in a variety of ways without departing from the spirit or scope of the subject matter described herein.

A user may navigate to various controls (also called elements) that reside in the window by a variety of means including mouse, keyboard, voice, or other input device. Input devices such as a keyboard or voice input that may not have a pointer associated with them may still have the concept of focus. With such an input device, a control with focus means the control to which input from the device is directed.

Throughout this document references are made to the phrases such as keyboard, keyboard device, keyboard focus (sometimes just called "focus"), and the like. Unless the context clearly dictates differently, each reference to such a phrase should be understood to mean any input device that does not have a pointer or the like that moves in concert with moving the device to indicate where input from the device is directed.

With keyboard devices, focus may be indicated by a variety of characteristics. For example, in one implementation, keyboard focus to a button may be indicated by bolding the characters of a button, placing a light dotted line within the button, or through other visual or audio indicators. With a checkbox, for example, focus may be indicated by placing a light dotted line around text associated with the checkbox. Focus may be indicated in many other ways without departing from the spirit or scope of the subject matter described herein.

A user may indicate which control should receive keyboard focus by navigating from one control to another. For example, a user may press tab or shift-tab to navigate to a next or previous control, respectively. What control is "next" or "previous" may be defined programmatically (e.g., though the use of tab order). When the last control of a window is reached, pressing tab may cause the first control of the window to receive keyboard focus.

Sometimes, it is desired to group controls such that pressing tab (or some other navigation key, such as one of the directional arrows of a keyboard) causes keyboard focus to move within a set of the controls and does not cause keyboard focus to move to controls in other sets. For example, pressing tab within a window such as window 900 may cause one of the controls 910, 920, and 925 to receive keyboard focus without causing focus to move to the menu 905 or the button 915.

Pressing control-tab (or some other navigation key) may cause another set of controls to be the subject of keyboard focus such that subsequently pressing tab cycles keyboard focus among the controls of the other set. For example, pressing control-tab in the window 900 while the OK button 920 has focus may cause focus to shift to the list box items 911-913. Subsequently pressing tab may cycle keyboard focus among the list box items 911-913. As another example, pressing the "alt" key while in a word processing document or other application may cause a menu item of a menu (e.g., such as menu 905) to receive keyboard focus. Thereafter, further keyboard navigation may cause other menu items of the menu or submenus thereof to receive keyboard focus until another key such as "alt" or "esc" is pressed.

Figure 10:
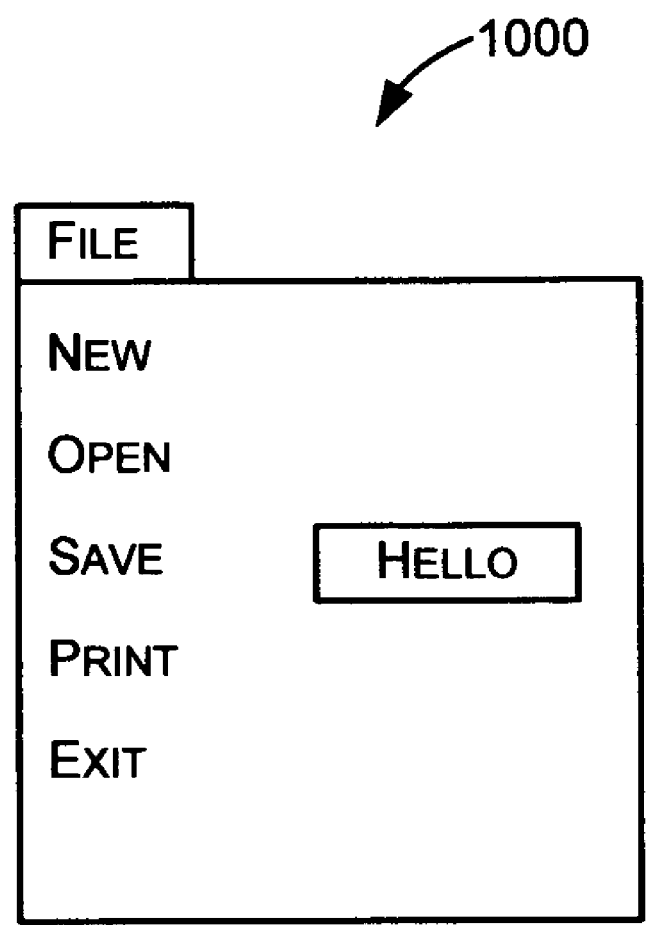
FIG. 10 is a diagram representing an exemplary menu in accordance with aspects of the subject matter described herein.

For example, pressing the "alt" key and then the down arrow may cause the submenu 1000 represented in FIG. 10 to be displayed and may cause the first menu item of the submenu (e.g., "New") to receive keyboard focus. Subsequently pressing the tab key, shift-tab key, down or up arrow keys may then cause other menu items of the submenu, another submenu, or the parent menu to receive keyboard focus. Pressing "esc" or "alt" may return focus to a control of FIG. 9.

Figure 11:
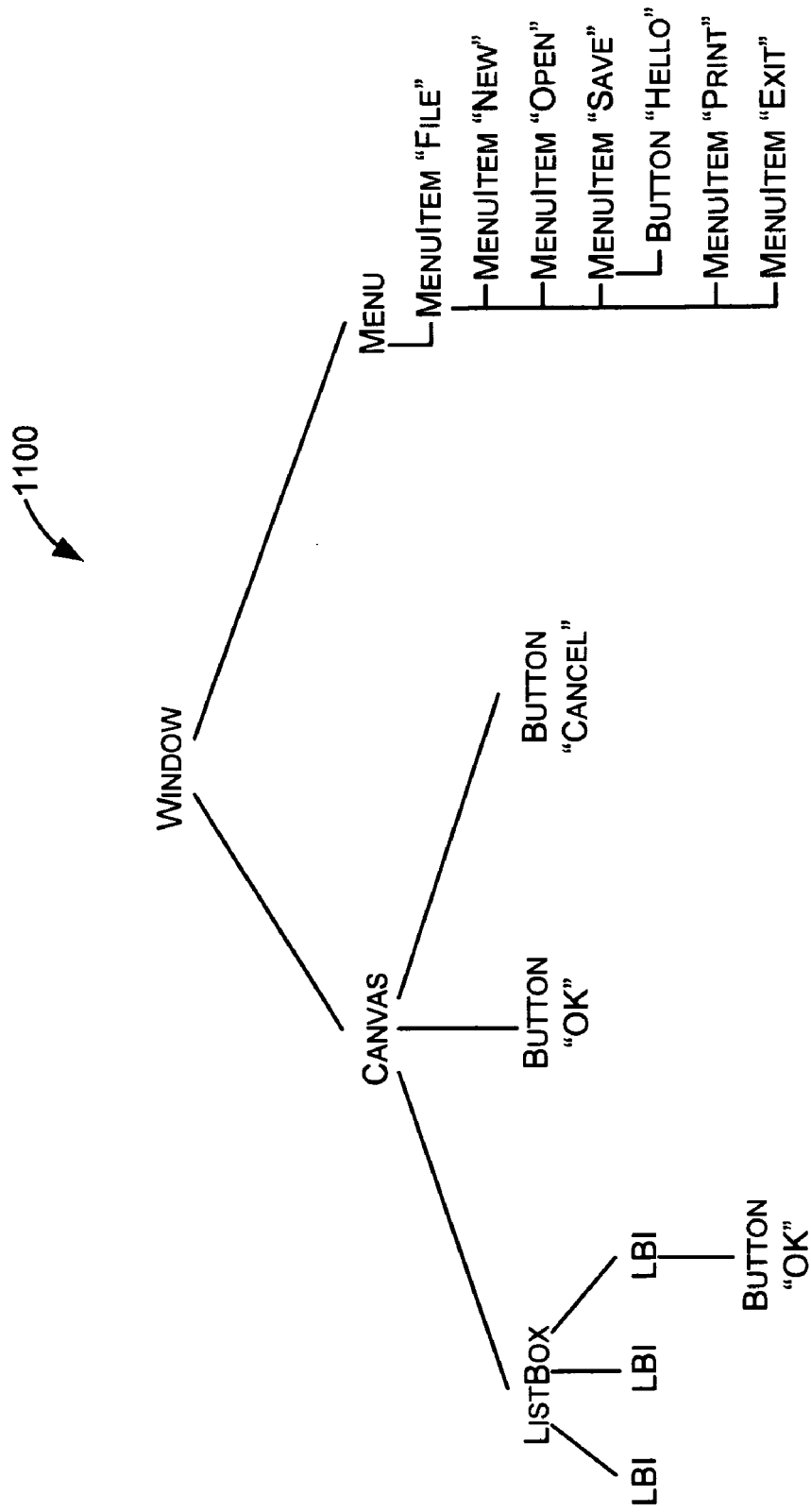
FIG. 11 is a diagram generally representing a visual tree in accordance with aspects of the subject matter described herein.

FIG. 11 is a diagram generally representing a visual tree in accordance with aspects of the subject matter described herein. A graphics framework (such as one described in conjunction with FIG. 15) may use a visual tree to display visual elements associated with controls. Such elements may include windows, canvases, grids, tool bars, list boxes, list box items, combo boxes, buttons, text, graphics, panels, menus, submenus, menu items, and the like. Some elements in the visual tree may include other elements in the visual tree. For example, a window element may include panels and grids. As another example, a list box item may include a button.

The visual tree may include multiple focus scopes. A focus scope refers to a set of controls that may be cycled through in receiving keyboard focus in response to pressing navigation keys. In one embodiment, a focus scope may be defined as a sub tree of the visual tree in which all controls that can receive focus and that are represented by the sub tree are part of the focus scope. When one focus scope is active and a user presses a navigation key to select another control to receive focus, another control in the focus scope is selected to receive keyboard focus even if another focus scope has a control that is capable of receiving keyboard focus. After tabbing to the last control (as defined by tab order for example) of a focus scope and pressing tab again, the first control of the focus scope is selected to receive keyboard focus.

Referring to FIG. 11, certain controls included in the canvas and its descendants may form one focus scope while the menu and its descendants may form another focus scope. Changing the focus to a control in one focus scope to a control in another focus scope may be accomplished by selected or predefined keystrokes such as alt, control-tab, or any other set of one or more keystrokes, or by selecting a control in the focus scope via a mouse or other pointer-associated device. Once focus is changed from a control in one focus scope to a control in another focus scope (sometimes referred to as changing focus scope) focus cycles through controls of the other focus scope in response to keyboard navigations until the focus scope changes again.

A user interface (UI) may include zero, one, two, or more focus scopes. When only one or less focus scopes exists (i.e., all controls are part of the same focus scope or no focus scope exists), cycling keyboard focus among the controls may occur through standard mechanisms (e.g., finding the next control to receive focus via tab order). When more than one focus scopes exist, a visual tree which identifies or is associated with the focus scopes and their controls may be used when changing keyboard focus as described below.

Within a focus scope, the top level (e.g., highest control in the visual tree also within the focus scope) or other designated control is given properties that indicate that the control is associated with a focus scope and which control within the focus scope has focus currently or had focus when focus was moved to a control in another focus scope. In one embodiment, two such properties may be called IsFocusScope and FocusedElement. If IsFocusScope=True, then the control is the top level or designated control of a focus scope. The FocusedElement may be a pointer or index that indicates which control of the focus scope has (or had) focus. As a user cycles through controls of a focus scope (thus changing keyboard focus), the FocusedElement properties may be updated appropriately.

In addition, each control may also have properties that assist in determining if the control has or had focus. In one embodiment, each control has properties including IsKeyboardFocused and IsFocused. If a control's IsKeyboardFocused=True, then the control currently has keyboard focus. In one embodiment, only one control in the UI may have IsKeyboardFocused=True at a given time. If a control's IsFocused=True, then the control currently has keyboard focus or had focus just before focus scope was changed. In one embodiment, only one control of each focus scope may have IsFocused=True at a given time.

When a user changes the focus scope, the IsFocusScope property may be set to False while the FocusedElement property remains set to the last control of the focus scope that had focus before changing the focus scope. When a user changes the focus scope back (e.g., to a previous focus scope), the FocusedElement property may be used to identify the control that first receives keyboard focus.

The visual tree 1100 of FIG. 11 may be part of a more complete visual tree used to display visual elements associated with FIGS. 9 and 10. Furthermore, a visual tree may also be used when changing keyboard focus even if zero or one focus scopes exist.

Figure 12:
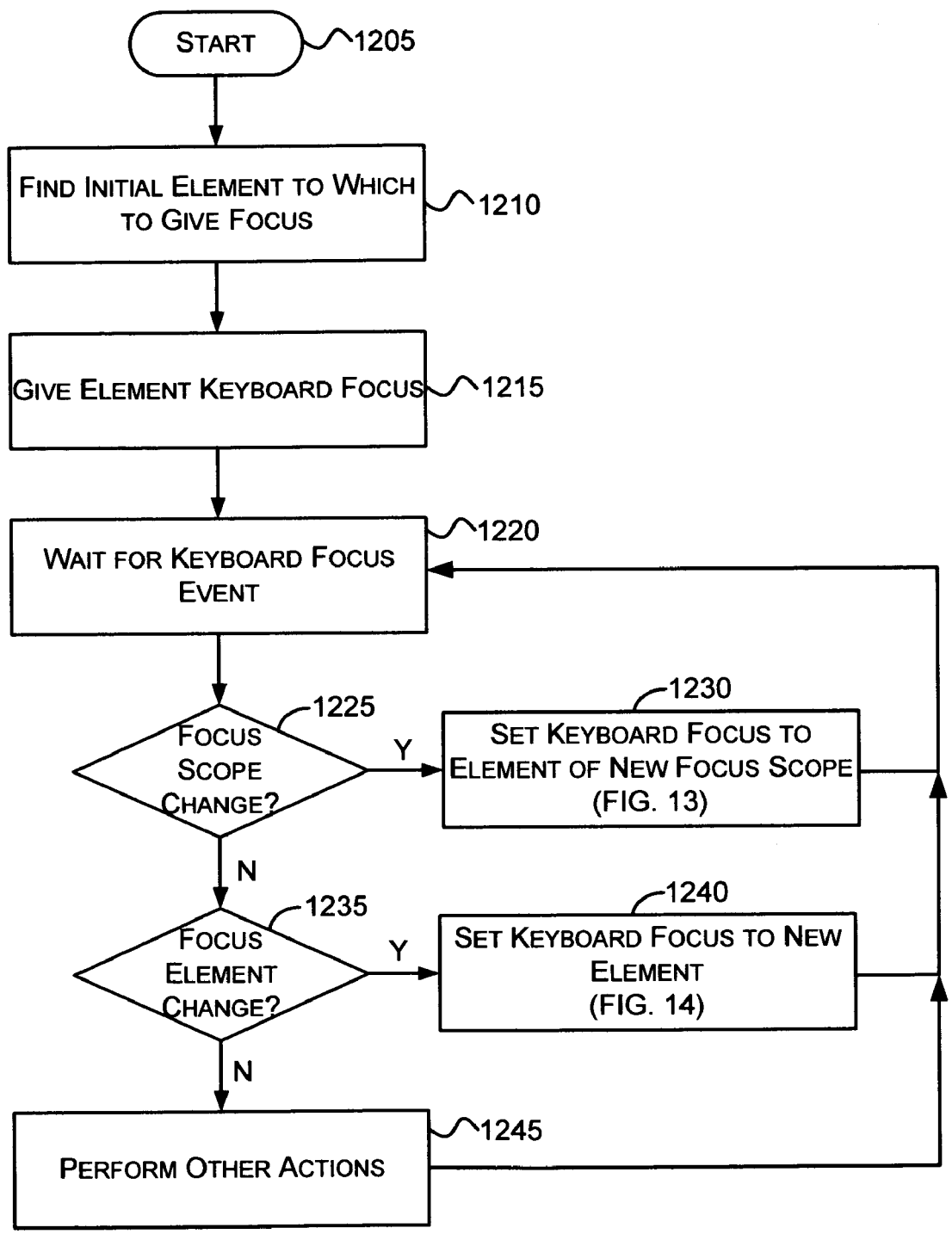
FIG. 12 is a flow diagram that generally represents actions that may occur in accordance with aspects of the subject matter described herein.

FIG. 12 is a flow diagram that generally represents actions that may occur in accordance with aspects of the subject matter described herein. At block 1205, the actions begin.

At block 1210, an initial element to which to give focus is found. In one embodiment, a software developer or user may set a FocusedElement property associated with the root of the visual tree to indicate the initial element to which to give focus. Also, a FocusedElement property associated with the root of the visual tree may be set when a default focus scope containing the root (as described below) has been previously activated. In either case, finding an initial element to which to give focus may involve obtaining the FocusedElement property from the root of the visual tree. In another embodiment, finding an initial element to which to give focus may involve a focus manager walking down (i.e., visiting the descendants of) a visual tree starting with the root of the visual tree.

In one embodiment, when finding an initial element to which to give focus, elements that are marked as being the top-level element for a focus scope may be skipped together with their descendants. In this embodiment, at least one descendant of the root element may not be a top-level element for a focus scope. Logically, the root element and any descendants that are not part of focus scopes may be considered to be part of a default focus scope that is activated upon initialization and whenever no other focus scope is active.

In walking down the visual tree, a focus manager may identify elements to which focus may be given (e.g., buttons, list boxes, text boxes, or other controls). After finding a default element (e.g., the first element to which focus could be given) or other designated element (e.g., by tab order) to which to give focus, the focus manager may indicate that the element has focus (e.g., by setting IsKeyboardFocus=True). The focus manager may also set other properties including IsFocused=True on the element (e.g., in case focus scope changes) and FocusedElement to point to the element (e.g., so that the element may be quickly found when focus scope changes back).

At block 1215, the element that is found is given keyboard focus. The actions that may occur when this is done are described in conjunction with blocks 1420-1430 of FIG. 14 (where the current element is set to the found element).

At block 1220, the actions pause until a keyboard focus event occurs. "Pausing" does not mean that the application is not able to do any other actions. Indeed the application may engage in various activities but the actions associated with keyboard focus may wait until a keyboard focus event occurs. Such an event may be generated or correspond to a set of one or more keystrokes (e.g., [control]-tab, tab, "alt", and the like) that indicate that a user wants to change the focus scope or focus element.

At block 1225, a determination is made as to whether the keyboard focus event involves a focus scope change. If so, the actions continue at block 1230; otherwise, the actions continue at block 1235.

At block 1230, the keyboard focus is set to an element of a new focus scope. This may involve setting various properties as described in more detail in conjunction with FIG. 13.

At block 1235, a determination is made as to whether the keyboard focus event involves a focus element change. If so, the actions continue at block 1240; otherwise, the actions continue at block 1245.

At block 1240, the keyboard focus is set to a new element within the focus scope. This may also involve setting various properties as described in more detail in conjunction with FIG. 14.

At block 1245, other actions are performed. In one embodiment, the actions may comprise ignoring the keyboard focus event. In another embodiment, an error may be generated. In yet another embodiment, other actions may be performed as appropriate.

Figure 13:
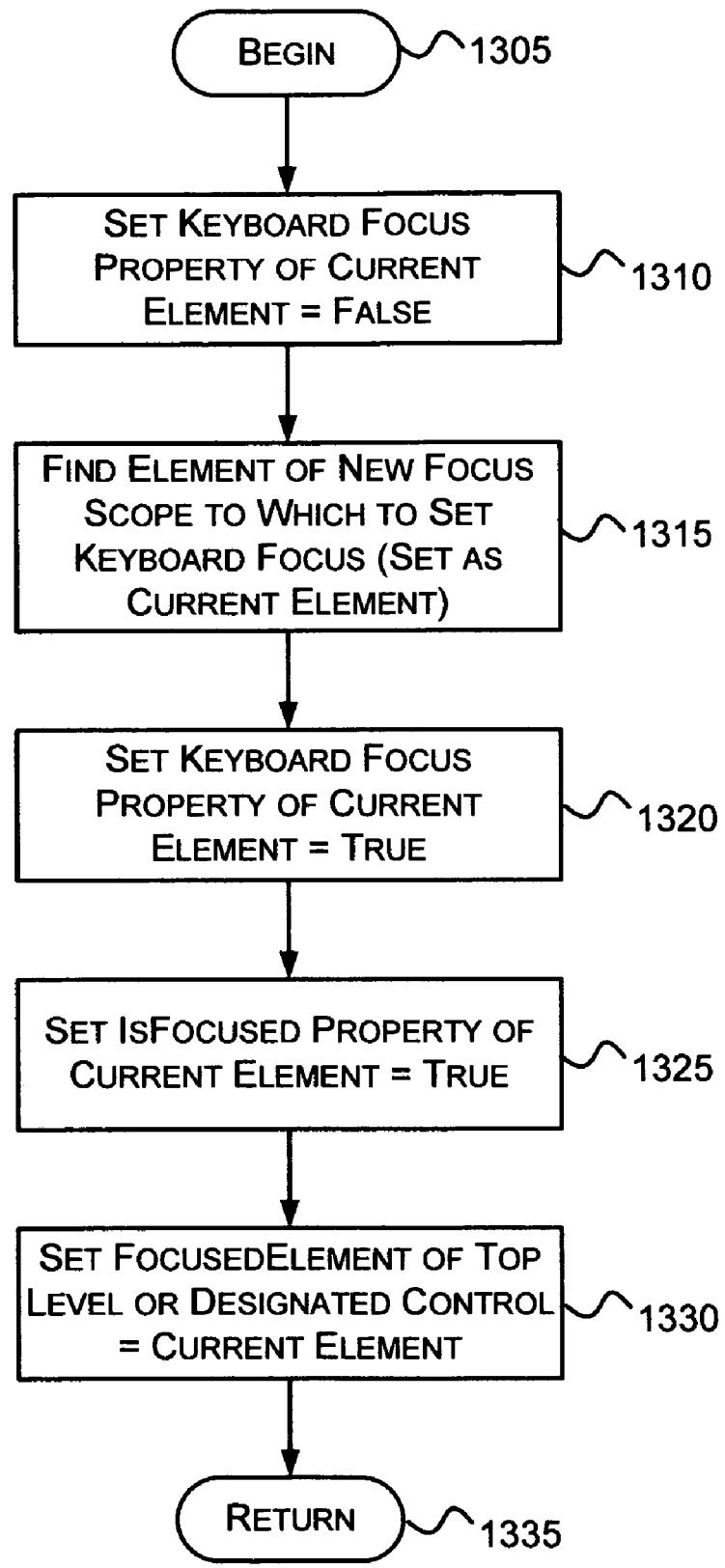
FIG. 13 is a flow diagram that represents actions corresponding to block 1230 of FIG. 12 that may occur in changing focus scope accordance with aspects of the subject matter described herein.

FIG. 13 is a flow diagram that represents actions corresponding to block 1230 of FIG. 12 that may occur in changing focus scope accordance with aspects of the subject matter described herein. At block 1305, the actions begin.

At block 1310, the keyboard focus property of the current element is set equal to False. In one implementation, this may involve setting IsKeyboardFocused=False for the current element.

At block 1315, an element of a new focus scope is found to which to set keyboard focus. Focus scopes (which may include the default focus scope) may be arranged in a collection, an array, or otherwise. When a user indicates that the user desires to change focus scopes, in one embodiment, the next focus scope may be selected. In another embodiment, the focus scope associated with the keystrokes the user enters is selected. If the focus scope has not been activated before, an element within the focus scope may be found and selected to be the element to receive keyboard focus. If the focus scope has been activated before or if the appropriate FocusedElement property was previously set by a user or software developer, the element to receive keyboard focus may be found by using the FocusedElement property of the top-level or designated control for the focus scope. In addition, the found element may be set as the current element (e.g., for future operations).

At block 1320, the keyboard focus property of the current element is set equal to True to indicate that the current element is the element to receive keyboard input. In one implementation, this may be accomplished by setting an IsKeyboardFocused property of the element=True.

At block 1325, an IsFocused property of the current element is set to True (if it is not already True). If the user subsequently changes the focus scope again while the IsFocused property of the current element is set to True, this has the effect of "remembering" or maintaining state information that indicates the element in the focus scope that had focus before the focus scope was changed.

At block 1330, the FocusedElement of the top-level or designated control for the focus scope is set to point to the current element. This may be done, as previously mentioned, to speed finding the element when the focus scope is subsequently activated.

At block 1335, the actions return and continue at block 1220 of FIG. 12.

Figure 14:
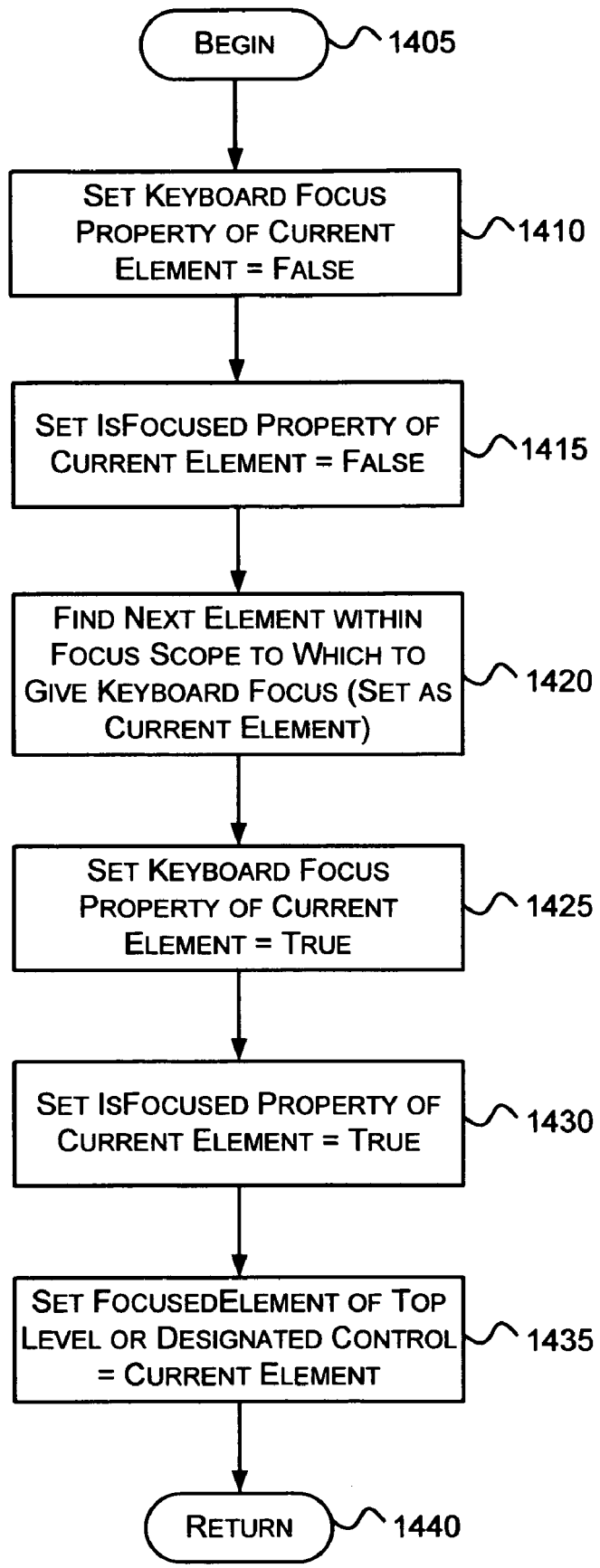
FIG. 14 is a flow diagram that represents actions corresponding to block 1240 of FIG. 12 that may occur in changing keyboard focus in accordance with aspects of the subject matter described herein.

FIG. 14 is a flow diagram that represents actions corresponding to block 1240 of FIG. 12 that may occur in changing keyboard focus in accordance with aspects of the subject matter described herein. At block 14, the actions begin.

At block 1410, the keyboard focus property of the current element is set equal to False. In one implementation, this may involve setting IsKeyboardFocused=False for the current element.

At block 1415, the IsFocused property of the current element is set equal to False.

At block 1415, the next element is found within the focus scope (which may include a default focus scope) to which to give keyboard focus. This may be accomplished by walking through the elements of the current focus scope to find a next element that is capable of receiving keyboard focus or to find an element that is designated (e.g., through tab order) to be the element to receive keyboard focus after the current element. Next and after as used in this context may mean finding an element that is before the current element (e.g., in tab order or position) in response to a reverse-cycling keyboard entry (e.g., [shift]-tab). The found element may be set as the current element (e.g., for future operations).

At block 1420, the keyboard focus property of the (now) current element is set equal to True. In one implementation, this may be accomplished by setting an IsKeyboardFocused property of the element=True.

At block 1425, an IsFocused property of the current element is set to True. If the user subsequently changes the focus scope again while the IsFocused property of the current element is set to True, this has the effect of "remembering" or maintaining state information that indicates the element in the focus scope that had focus before the focus scope was changed.

At block 1435, the FocusedElement of the top-level or designated control for the focus scope is set to point to the current element. This may be done, as previously mentioned, to speed finding the element when the focus scope is subsequently activated.

At block 1440, the actions return and continue at block 1220 of FIG. 12.

In some embodiments, the actions described in conjunction with FIG. 14 may be performed in other orders without departing from the spirit or scope of the subject matter described herein. Furthermore, actions associated with various blocks may be combined into one block. Additionally, while certain variable names have been described, other variable names or structures may be used to store state information without departing from the spirit or scope of the subject matter described herein.

Figure 15:
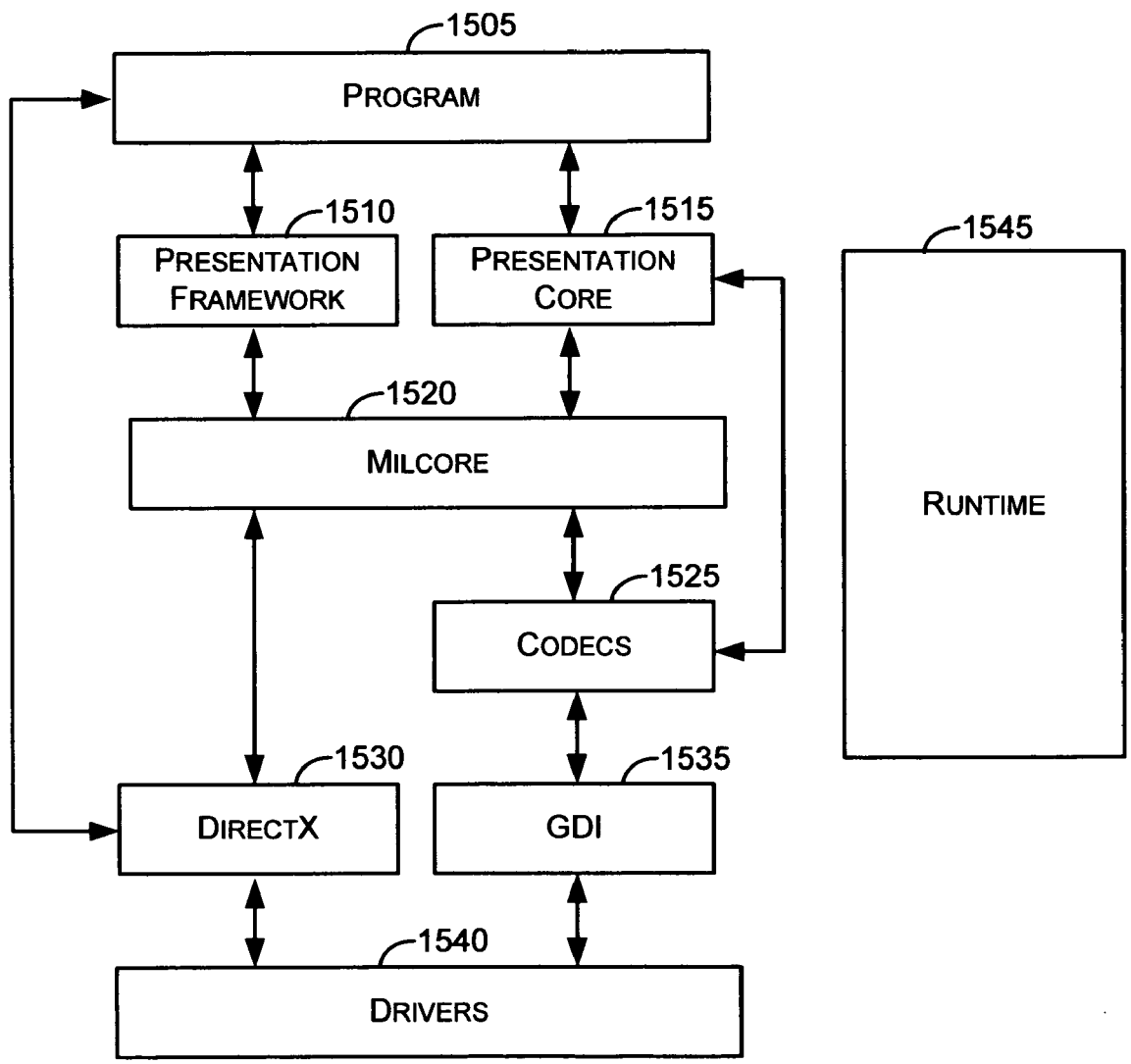
FIG. 15 is a block diagram that generally represents an environment in which aspects of the subject matter described herein may operate.

FIG. 15 is a block diagram that generally represents an environment in which aspects of the subject matter described herein may operate. The environment may include a program 1505, a presentation framework 1510, a presentation core 1515, a milcore 1520, a runtime component 1545, a codecs component 1525, a DirectX component 1530, a graphics device interface (GDI) 1535, drivers 1540, and runtime module 1545.

The presentation framework 1510 is exposed to software developers and includes APIs by which various requests may be made. Top level objects of a graphics framework, such as buttons, list boxes, combo boxes, scroll bars, splitters, and the like, may reside in the presentation framework 1510.

The presentation core 1515 is also exposed to software developers through APIs by which various requests may be made. Interfaces and properties (including those described above and below) may be exposed through the presentation core 1515. The properties of a top level object of a graphics framework, such as brushes, pens, shapes, animation support, text, and the like, may reside in the presentation core 1515 or the presentation framework 1510.

In one implementation, the following methods and properties may be exposed through public APIs via the presentation core 1515 in accordance with aspects of the subject matter described herein.

GetFocusedElement: Returns the property value of FocusedElement property. The return value is validated to be in the focus scope associated with a top-level or designated element. If no element in the focus scope is pointed to by the FocusedElement property this method may return NULL.

GetFocusScope: Finds the closest visual ancestor that has IsFocusScope set to true. This may be useful in finding the top-level or designated element associated with a focus scope.

SetFocusedElement: Sets the property value of a FocusedElement property. This may be used by a user or software developer to indicate an element within a focus scope to which initial focus is to be given, or may be used by a focus manager to keep track of the current or last focus within an activated or deactivated scope, respectively.

IsFocusScope: This property may be used to designate a top-level or designated element associated with a focus scope.

FocusedElement: This property may be defined on a top-level or designated element. The property points to (or indexes) the element that has logical focus within the focus scope. Logical focus refers to an element that currently has keyboard focus or that had keyboard focus just before focus scope changed.

The milcore 1520 implements functionality provided by the APIs of the presentation framework 1510 and the presentation core 1515. The milcore 1520 may be accessed by the presentation core 1515 and the presentation framework 1510.

The runtime component 1545 may provide an environment for running intermediate language created from one or more programming languages. For example, the runtime component may be used to execute intermediate language created from code that implements the presentation core 1515, the presentation framework 1510, and the program 1505.

The codecs 1525 may be used by the presentation core 1515 and the milcore 1520 for imaging tasks such as encoding and decoding images.

The DirectX component 1530 may provide APIs to enable a software developer to access specialized hardware features (such as video and sound hardware features) without having to write hardware-specific code. The program 1505 and milcore 1520 may use the DirectX component 1530 to access the features.

The GDI 1535 allows processes to display graphics and formatted text on a video display and may interact with device drivers that display graphics and formatted text on behalf of such processes.

The drivers 1540 may be used to interface with hardware while the runtime 1545 may be used to execute intermediate code generated from various programming languages.

Although some lines have been drawn between various components of the environment of FIG. 15 to represent the capacity to communicate between these components, more, fewer, or other communication paths may exist without departing from the spirit or scope of the subject matter described herein. Furthermore, while various components of the environment have been described, it will be recognized that more, fewer, or other components may be used or configured in other configurations without departing from the spirit or scope of the subject matter described herein.

It will be recognized that aspects of the subject matter described herein may be used to greatly simplify application development. For example, instead of building a control that is non-standard and able to peek at keyboard input to see if it relates to the control, a developer may build a control that reacts only when it has keyboard focus and that does not need to peek at keyboard input to see if it relates to the control. For example, using aspects of the subject matter described herein, in a word processor, a menu control may be constructed that does not need to listen to each keystroke to see if the menu control needs to react to the keystroke. Rather, a menu control may be built such that the menu control only needs to look at keyboard input when the focus scope including the menu control is active.

In other words, aspects of the subject matter described herein allow a developer to develop controls that can be placed in any part of the application (e.g., the menu, a toolbar or control bar, and the like) without changing the code of the controls based on which part of the application they are placed.

As can be seen from the foregoing detailed description, aspects have been described related to user interfaces. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. At least one computer-readable storage medium for use in a system that accesses visual elements having multiple controls that can receive focus in response to a user pressing navigation keys, the computer-readable storage medium containing instructions which when executed by a computer, perform a method for cycling between different focus scopes, the method comprising:
    accessing a content page having multiple controls that can be selected from a keyboard focus, the multiple controls being arranged in a visual tree having multiple focus scopes, wherein each of the multiple focus scopes defines a sub tree of the visual tree, wherein each sub tree includes a full set of controls that is cycled through in response to pressing a predetermined navigation key, and wherein a top-level element of each sub tree includes multiple properties, including at least:
        a property associating the control with its respective focus scope; and
        a property defining:
            when focus for the content page is on a control of the respective focus scope, a currently selected control; and
            when focus for the content page is on a control not within the respective focus scope, a last selected control within the focus scope;
    wherein each of the multiple controls of the content page maintain their own properties, including at least:
        a keyboard focus property, wherein only one of all controls on the content page can have a true value for the keyboard focus property; and
        a focus property, wherein only one of all controls within each focus scope can have a true value for the focus property; and
    receiving selection of a second predetermined navigation key and, in response:
        changing from a first focus scope having a first set of controls to a second focus scope having a second set of controls;
        updating information in the top-level element of the first focus scope to identify the last selected control;
        updating information in the top-level element of the second focus scope to identify the currently selected control;
        changing the keyboard focus property of the last selected control to have a false value while maintaining the focus property as having a true value; and
        changing the keyboard focus property of the currently selected control to have a true value; and
    receiving selection of the second predetermined navigation key and, in response returning to the first focus scope and automatically using the property identifying the last selected control of the first focus scope and setting keyboard focus to the identified last selected control, while also changing the keyboard focus property of the last selected control to a true value.

2. The at least one computer-readable storage medium of claim 1, wherein the selection of the second predetermined navigation key corresponds to a set of two or more keystrokes designated to indicate that the focus scope is changed.

3. The at least one computer-readable storage medium of claim 1, wherein the focus scope comprises a set of one or more elements each capable of receiving the keyboard focus.

4. The at least one computer-readable storage medium of claim 1, wherein an application includes two or more focus scopes, and wherein information is maintained for each focus scope about a last element within the focus scope that has or had keyboard focus before the focus event.

5. The at least one computer-readable storage medium of claim 4, wherein focus events that do not relate to changing the focus scope cause keyboard focus to change to elements within a single focus scope.

6. The at least one computer-readable storage medium of claim 1, wherein the information comprises a property that indicates that the element has or had keyboard focus.

7. The at least one computer-readable storage medium of claim 1, wherein the information comprises a property that points to the element, wherein the property is associated with the top-level element of the first focus scope.

8. The at least one computer-readable storage medium of claim 1, further comprising changing from the first focus scope to another focus scope and updating information regarding an element of the other focus scope to indicate that the element of the other focus scope has or had keyboard focus.

9. The at least one computer-readable storage medium of claim 1, wherein the first focus scope does not obtain keyboard input unless the keyboard focus is set to the element.

10. In a computing environment, a method for cycling between different focus scopes while preserving focus on last selected elements in the focus scopes, the method comprising:
    accessing a content page having multiple elements that can be selected from a keyboard focus, the multiple elements being arranged to have multiple focus scopes, and wherein each of the multiple focus scopes include a full set of elements that is cycled through in response to a predetermined keyboard input, and wherein each of the multiple focus scopes includes:
        one or more properties on a top-level of each focus scope defining a last selected focus element within the respective focus scope; and
        at least two properties for each element, the at least two properties including a keyboard focus property that can be true for only one element on the content page, and a focus property that can be true for only one element of each focus scope;
    receiving a user input requesting focus on a first element in a first focus scope and updating a property value of the one or more properties on the top-level of the first focus scope to indicate that the first element has focus within the first focus scope, and also updating the at least two properties of the first element such that the keyboard focus property and the focus property both indicate that the first element has focus;

receiving a user input requesting a change in focus from the first element of the first focus scope to a second focus scope and, in response, changing focus to a second element within the second focus scope, while also updating only the keyboard focus property of the first and second elements, so that the keyboard focus property of only the second element indicates keyboard focus, and while maintaining the focus property of the first element such that it indicates that the first element has focus; and receiving a user input requesting a change in focus to the first focus scope and changing focus to the first focus scope, wherein changing focus to the first focus scope includes using the value at the top-level of the first focus scope to change focus to the first element, such that the last selected element of the first focus scope automatically receives focus upon returning focus to the first focus scope, and the keyboard focus property of the first element is changed to indicate that the first element has focus.

11. The method of claim 10, wherein using the value to change focus to the first element comprises providing keyboard focus to an element pointed to by the value.

12. The method of claim 10, wherein using the value to change focus to the first element comprises searching the first focus scope for an element that includes the value.

13. The method of claim 10, wherein the focus comprises an element to which keyboard input is directed.

14. The method of claim 10, wherein the focus comprises an element to which voice input is directed.

15. The method of claim 10, wherein the first focus scope is associated with a top level element of a visual tree used to render elements to a display, wherein the visual tree includes a hierarchical representation of the elements.

16. The method of claim 10, further comprising receiving multiple events related to changing keyboard focus and in response thereto, changing keyboard focus to elements within the second focus scope.

17. At least one computer-readable storage medium for use in a system that accesses visual elements having multiple controls that can receive focus in response to user input, the computer-readable storage medium containing instructions which when executed by a computer, perform the method of claim 10.

18. The at least one computer-readable storage medium of claim 17, further comprising receiving a request to identify a top-level element in a focus scope associated with the element.

19. The at least one computer-readable storage medium of claim 18, wherein the value was updated in a property associated with the top-level element.

20. A method as recited in claim 10, wherein the first focus scope is in a first window, wherein the second focus scope is in a second window, and wherein a runtime component is used to store the value at the top-level of the first focus scope.

* * * * *